United States Patent
Ishiyama

(10) Patent No.: US 9,218,842 B2
(45) Date of Patent: Dec. 22, 2015

(54) LIBRARY APPARATUS AND METHOD OF READING INFORMATION OF RECORDING MEDIUM

(71) Applicant: FUJITSU LIMITED, Kawasaki-shi, Kanagawa (JP)

(72) Inventor: Kazunori Ishiyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/553,500

(22) Filed: Nov. 25, 2014

(65) Prior Publication Data

US 2015/0243318 A1    Aug. 27, 2015

(30) Foreign Application Priority Data

Feb. 21, 2014    (JP) ................. 2014-031278

(51) Int. Cl.
  *G11B 15/68*    (2006.01)
  *G11B 17/22*    (2006.01)
(52) U.S. Cl.
  CPC .............. *G11B 15/68* (2013.01); *G11B 15/689* (2013.01); *G11B 17/22* (2013.01); *G11B 17/228* (2013.01)
(58) Field of Classification Search
  USPC ........................................................ 360/91
  See application file for complete search history.

(56) References Cited

U.S. PATENT DOCUMENTS

| 5,303,214 | A | * | 4/1994 | Kulakowski et al. ........ 369/30.3 |
| 5,729,464 | A | * | 3/1998 | Dimitri ........................ 700/215 |
| 8,254,054 | B2 | * | 8/2012 | Tanaka ......................... 360/92.1 |
| 2007/0165321 | A1 | * | 7/2007 | Hashimoto .................... 360/69 |
| 2007/0236826 | A1 | * | 10/2007 | Starr ............................... 360/90 |
| 2008/0065906 | A1 | * | 3/2008 | Itagaki et al. ................ 713/193 |
| 2009/0190252 | A1 | * | 7/2009 | Pollard et al. ............... 360/92.1 |

FOREIGN PATENT DOCUMENTS

| JP | 5-144156 | 6/1993 |
| JP | 6-150499 | 5/1994 |
| JP | 2007-188615 | 7/2007 |

\* cited by examiner

*Primary Examiner* — Wayne Young
*Assistant Examiner* — Carlos E Garcia
(74) *Attorney, Agent, or Firm* — Staas & Halsey LLP

(57) ABSTRACT

A library apparatus, includes: a plurality of cells in each of which a cartridge-type recording medium is attachably and detachably accommodated; a robot including a hand configured to handle the recording medium; and an information reading unit which is attachably and detachably accommodated in the cells and includes a plurality of readers configured to read information of the recording medium, wherein when the information reading unit is pulled into a portion of the hand, the plurality of readers project to be capable of reading the information of the recording medium.

18 Claims, 21 Drawing Sheets

LIBRARY APPARATUS AND METHOD OF READING INFORMATION OF RECORDING MEDIUM

CROSS-REFERENCE TO RELATED APPLICATION

This application is based upon and claims the benefit of priority of the prior Japanese Patent Application No. 2014-031278, filed on Feb. 21, 2014, the entire contents of which are incorporated herein by reference.

FIELD

The embodiments discussed herein are related to a library apparatus and a method of reading information of a recording medium.

BACKGROUND

A controller of a magnetic tape library apparatus finds individual information such as an error rate, the number of mounting times, and the like for each of multiple magnetic tape cartridges accommodated in a cell. Accordingly, a magnetic tape cartridge has an attached barcode label indicating a serial number and the like, and a built-in cartridge memory recording the updated individual information. In reading the individual information from the cartridge memory, a robot which is built in the magnetic tape library causes a unit having the same shape as that of the magnetic tape cartridge and including a reader mounted to read the individual information to face the magnetic tape cartridge.

A related technology is disclosed in Japanese Laid-open Patent Publication No. 2007-188615.

SUMMARY

According to an aspect of the embodiments, a library apparatus, includes: a plurality of cells in each of which a cartridge-type recording medium is attachably and detachably accommodated; a robot including a hand configured to handle the recording medium; and an information reading unit which is attachably and detachably accommodated in the cells and includes a plurality of readers configured to read information of the recording medium, wherein when the information reading unit is pulled into a portion of the hand, the plurality of readers project to be capable of reading the information of the recording medium.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

For example, in a magnetic tape library apparatus in which several hundreds to several thousands or more spools of magnetic tape cartridges are accommodated, it may take an enormous amount of time to read individual information of all the magnetic tape cartridges. Accordingly, a user may wait for a several hours or more until the magnetic tape library apparatus becomes usable.

Figure 1:
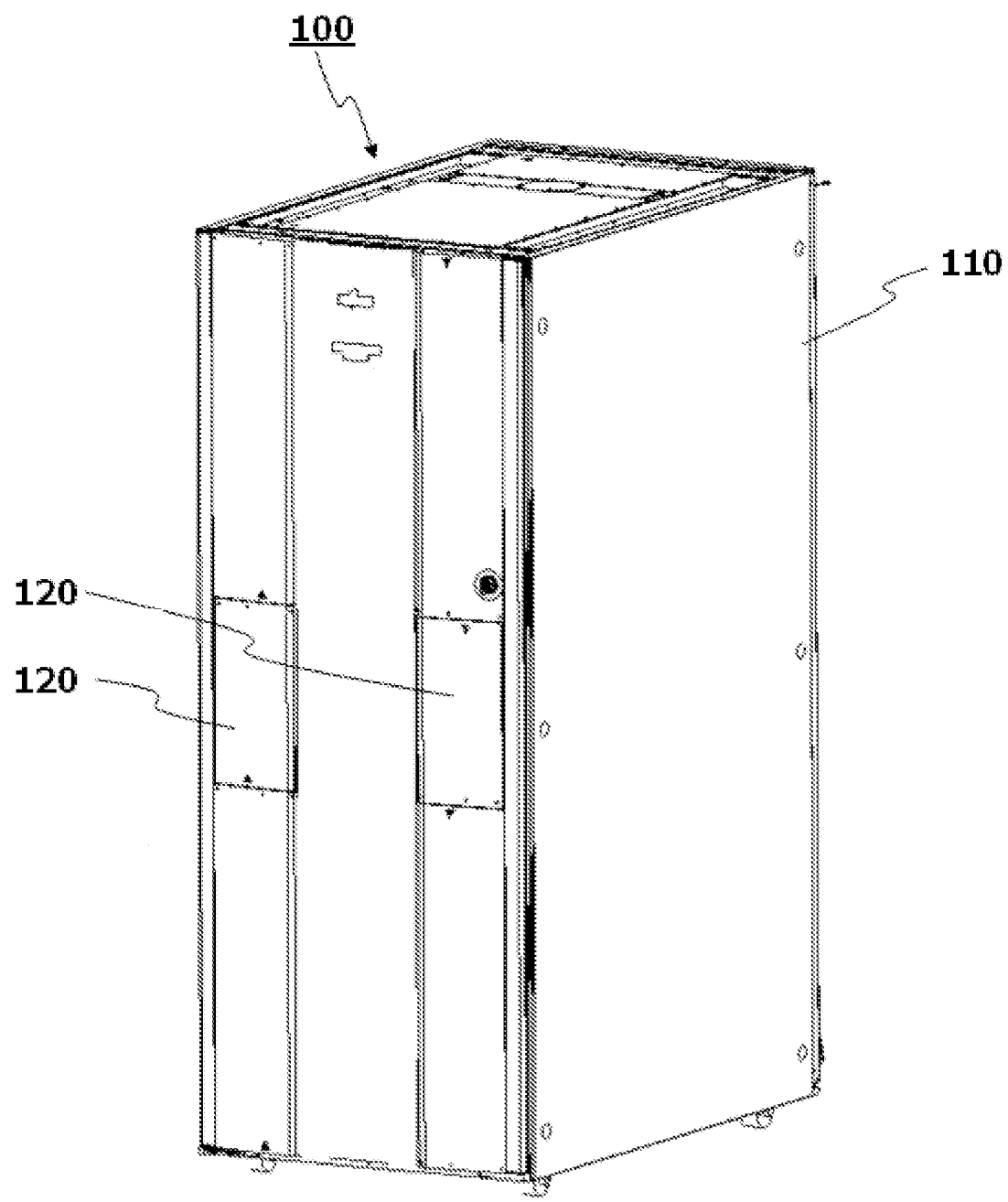
FIG. 1 illustrates an exemplary perspective view of a magnetic tape library apparatus.

FIG. 1 illustrates an exemplary perspective view of a magnetic tape library apparatus. For example, a library apparatus may be a cartridge-type recording medium and may include a magnetic tape library apparatus. The library apparatus may be used for data backup or the like, for example.

A magnetic tape library apparatus 100 has magnetic tape cartridges of several hundreds to several thousands or more spools mounted inside a substantially cuboid-shaped casing 110. On the front surface of the casing 110, two cartridge access stations (CASs) 120 are provided so that a magnetic tape cartridge is taken in and out from the magnetic tape library apparatus 100. Through the CAS 120, the magnetic tape cartridge is taken in and out by a unit of a magazine in which a certain number of magnetic tape cartridges are accommodated. On the front surface of the casing 110, an openable and closable door is provided so that a magnetic tape cartridge is manually taken out and in by an operator or the like. For example, the cartridge-type recording medium may include a magnetic tape cartridge.

Figure 2:
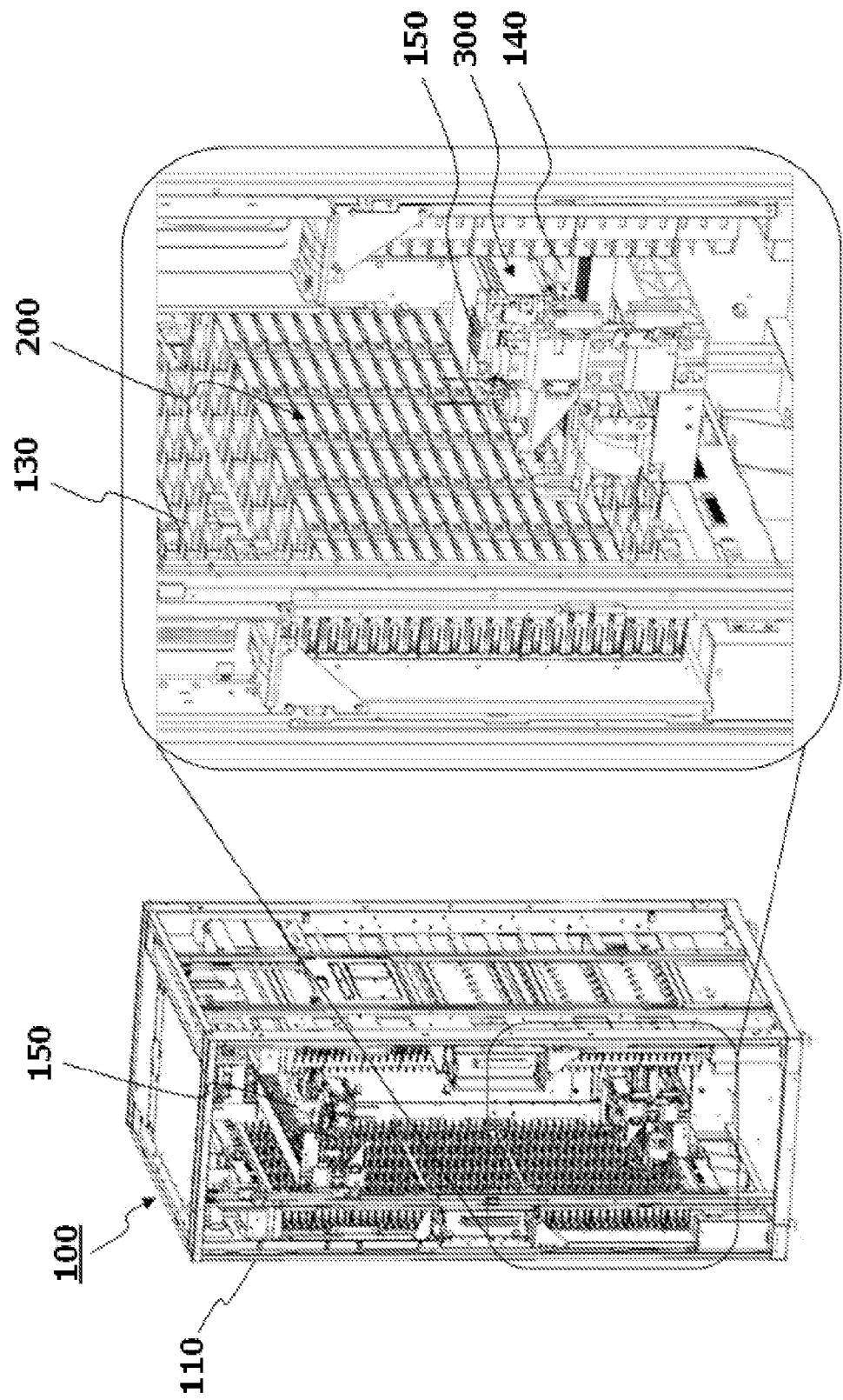
FIG. 2 illustrates an exemplary perspective view of an inside of a magnetic tape library apparatus.

FIG. 2 illustrates an exemplary perspective view of an inside of a magnetic tape library apparatus. As illustrated in FIG. 2, the magnetic tape library apparatus 100 includes multiple cells 130, in which multiple magnetic tape cartridges 200 are accommodated, multiple tape drives 140 which read and write data of the magnetic tape cartridges 200, and a pair of upper and lower robots 150.

Figure 3:
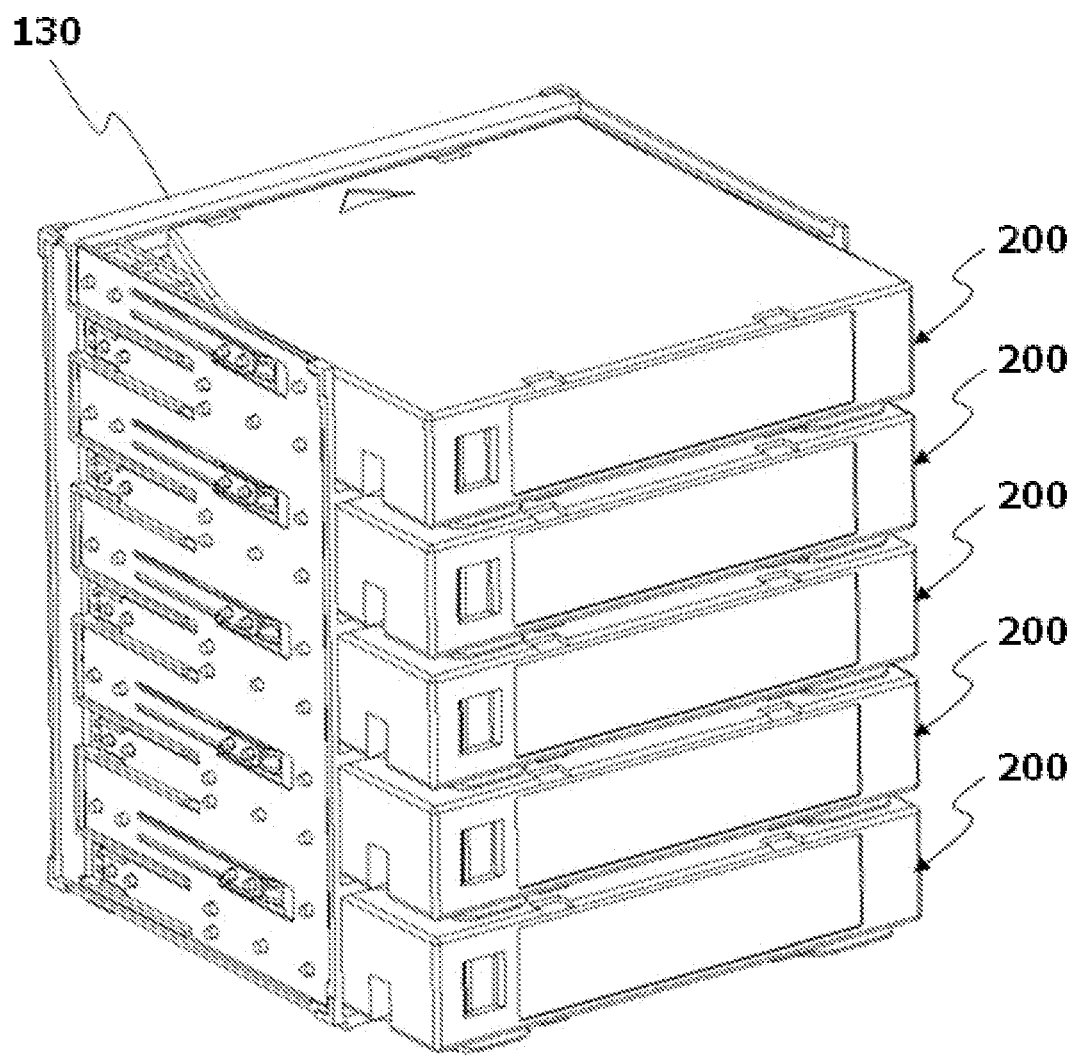
FIG. 3 illustrates an exemplary perspective view of a cell in which magnetic tape cartridges are accommodated.

FIG. 3 illustrates an exemplary perspective view of a cell in which magnetic tape cartridges are accommodated. As illustrated in FIG. 3, in the cell 130, a certain number (for example, 5 rolls) of the magnetic tape cartridges 200 are accommodated in a state of being stacked in the vertical direction. The multiple cells 130 are arranged longitudinally and horizontally along both sides of the casing 110, which face each other. The tape drive 140 reads and writes data in contact with a magnetic tape installed in the magnetic tape cartridge 200. The robot 150 is arranged in each of the upper and lower portions in the center of the casing 110. The robot 150 includes an arm portion which is movable in at least three axes (the X axis, the Y axis, and the Z axis) directions which are orthogonal to each other and is rotatable on a horizontal plane defined by the X axis and the Y axis. In the arm portion of the robot 150, a hand 300 to handle the magnetic tape cartridge 200 is provided. The robot 150 conveys and mounts the magnetic tape cartridge 200 accommodated in the cell 130 in the tape drive 140. In addition, the robot 150 coveys and accommodates the magnetic tape cartridge 200 mounted in the tape drive 140 in the cell 130.

Figure 4:
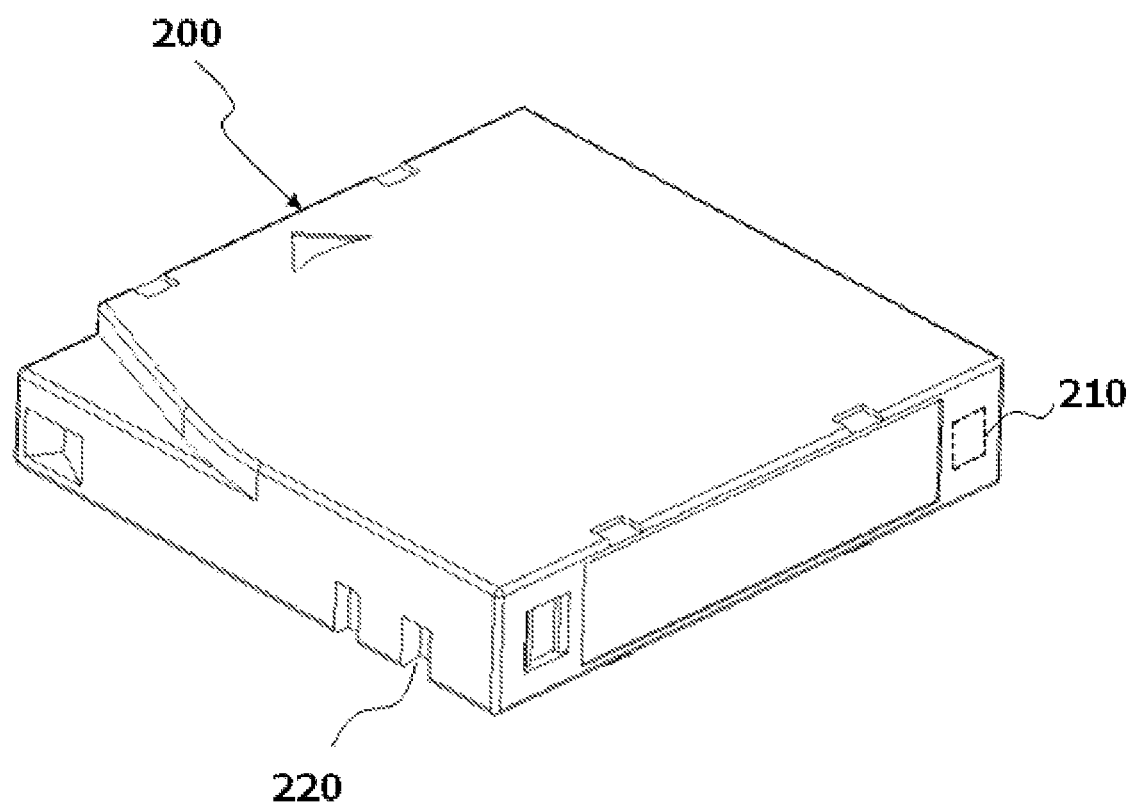
FIG. 4 illustrates an exemplary perspective view of a magnetic tape cartridge.

FIG. 4 illustrates an exemplary perspective view of a magnetic tape cartridge. As illustrated in FIG. 4, the magnetic tape cartridge 200 has a substantially cuboid outer shape. In the magnetic tape cartridge 200, a cartridge memory 210 to record individual information such as an error rate, the number of mounting times, and the like, is built-in inside of the front surface facing the robot 150. For example, the cartridge memory 210 may be a non-volatile memory in which reading and writing of data may be performed in a non-contact manner through a near distance radio communication using an electromagnetic field or electric waves. On the both sides adjacent to the front surface of the magnetic tape cartridge 200, recessed portions 220 are formed which respectively engage with claw portions provided in the hand 300 of the robot 150 and are used for inserting and removing the magnetic tape cartridge 200 into and from the cell 130.

Figure 5:
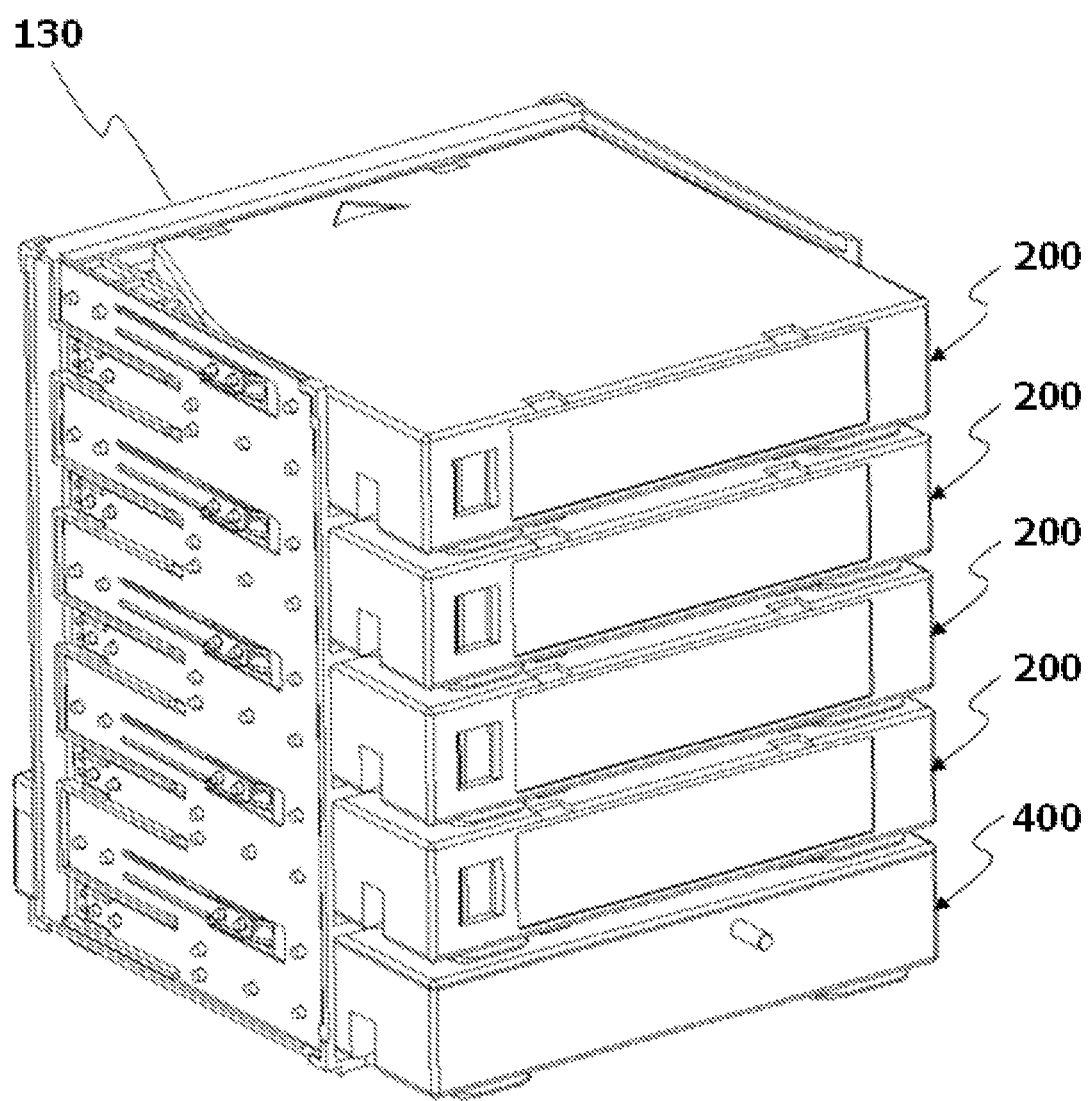
FIG. 5 illustrates an exemplary perspective view of a cell in which information reading units are accommodated.

FIG. 5 illustrates an exemplary perspective view of a cell in which an information reading unit is accommodated. For example, as illustrated in FIG. 5, among the multiple cells 130 of the magnetic tape library apparatus 100, the cell 130 to which the upper and lower robots 150 are accessible accommodates an information reading unit 400 that reads individual information from a cartridge memory 210 of the magnetic tape cartridge 200. The information reading unit 400 may have outer dimensions substantially same as that of the magnetic tape cartridge 200 so that it is detachably accommodated in the cell 130. Also the information reading unit 400 may be accommodated in at least two cells 130 in order that the magnetic tape library apparatus 100 have a redundant configuration. For example, even when one information reading unit 400 fails, the other information reading unit 400 may read the individual information of the magnetic tape cartridge 200.

Figure 6A:
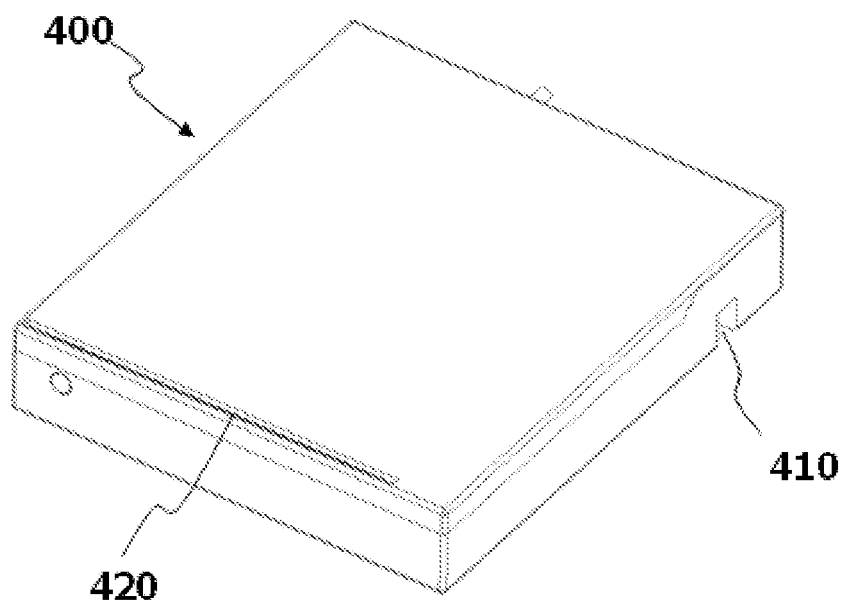
FIG. 6A and FIG. 6B illustrate an example of an information reading unit in a non-operating state.
Figure 6B:
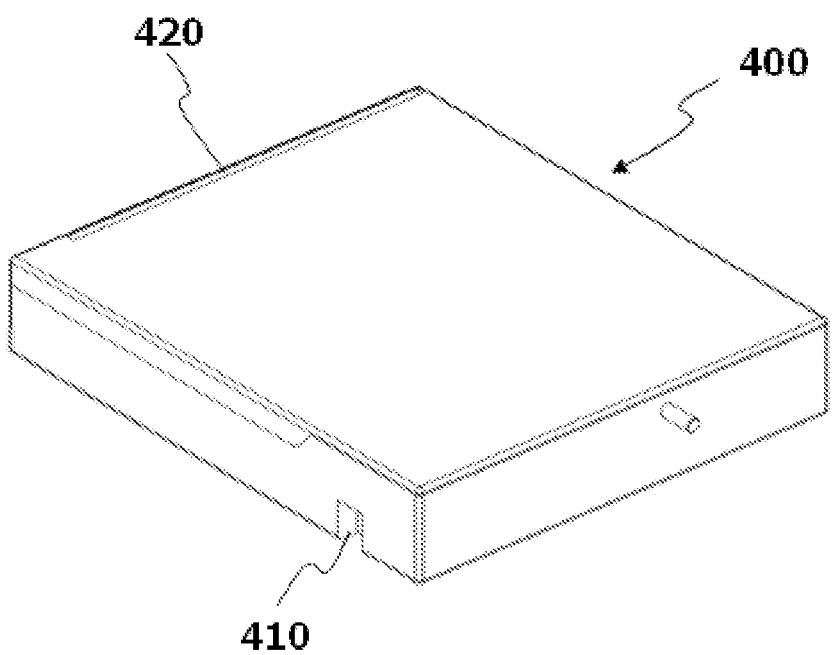
Figure 7A:
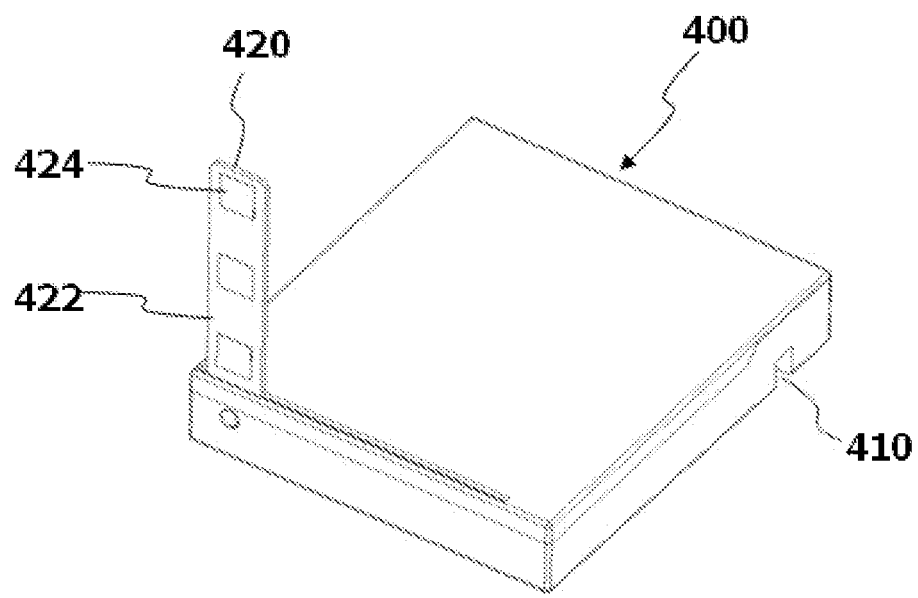
FIG. 7A and FIG. 7B illustrate an example of an information reading unit in an operating state.
Figure 7B:
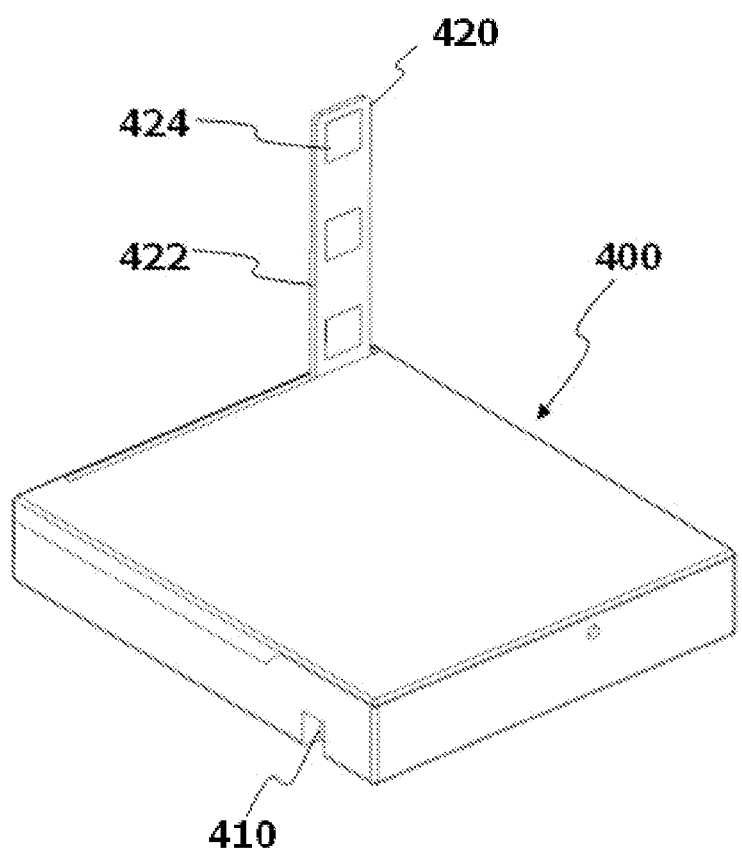

FIG. 6A and FIG. 6B illustrate an example of an information reading unit in a non-operating state. FIG. 6A illustrates a perspective view diagonally seen from the back of the information reading unit. FIG. 6B illustrates a perspective view diagonally seen from the front of the information reading unit. FIG. 7A and FIG. 7B illustrate an exemplary information reading unit in an operating state. FIG. 7A illustrates a perspective view diagonally seen from the back of the information reading unit. FIG. 7B illustrates a perspective view diagonally seen from the front of the information reading unit. As illustrated in FIG. 6, on the both sides adjacent to the front surface of the information reading unit 400, recessed portions 410 are formed which respectively engage with claw portions provided in the hand 300 of the robot 150 and are used for inserting and removing the information reading unit 400 into and from the cell 130. In a position adjacent to the back surface of the information reading unit 400, an information reading mechanism 420 is provided which projects when the information reading unit 400 is pulled into the innermost portion of the hand 300 and which becomes capable of reading the individual information from the cartridge memory 210 of the magnetic tape cartridge 200. The information reading mechanism 420 has a rectangular-shaped plate member 422 which is rotatable by substantially 90 degrees between a fallen position illustrated in FIG. 6 and an upright position illustrated in FIG. 7 and three memory readers 424 attached to the plate member 422 in the longitudinal direction. For example, by that a memory reader 424 faces a cartridge memory 210 of the magnetic tape cartridge 200, it becomes possible to read the individual information of the magnetic tape cartridge 200 in a non-contact manner. The number of the memory readers 424 of the information reading mechanism 420 may be three, and, for example, be any number according to the outer dimensions (for example, height) of the magnetic tape cartridge 200.

Figure 8:
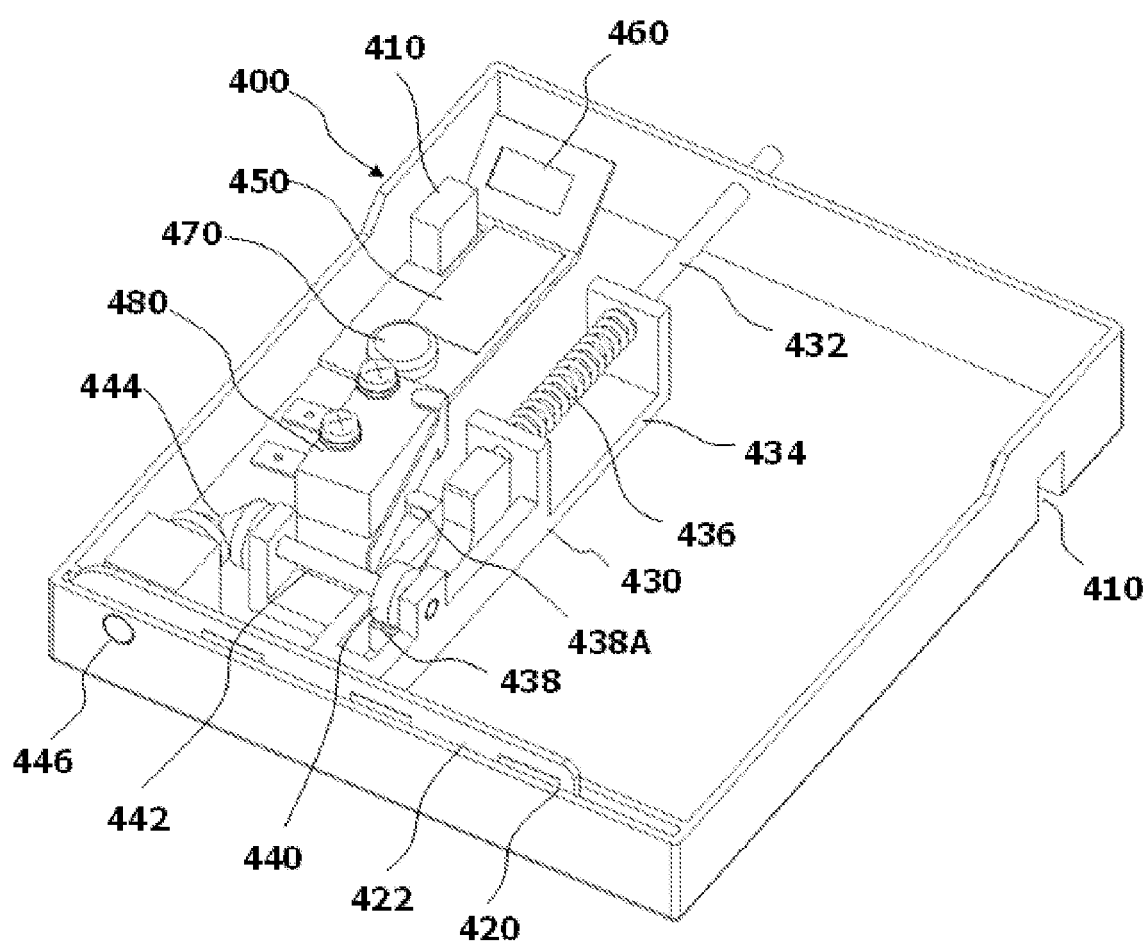
FIG. 8 illustrates an exemplary perspective view of an inside of a information reading unit in a non-operating unit.
Figure 9:
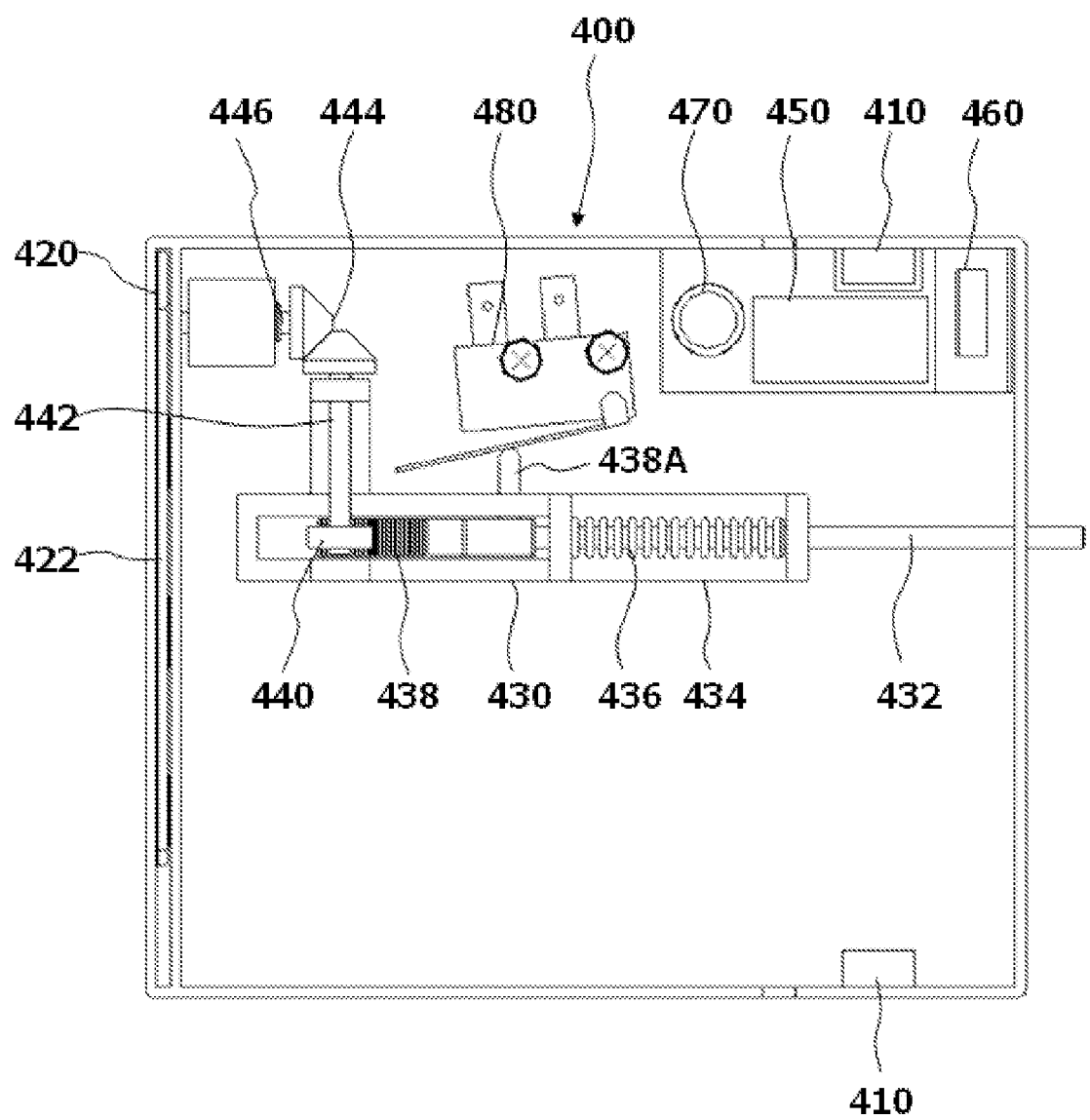
FIG. 9 illustrates an exemplary plan view of an inside of an information reading unit in a non-operating state.

FIG. 8 illustrates an exemplary perspective view of an inside of an information reading unit in a non-contact state. FIG. 9 illustrates an exemplary plan view of an inside of an information reading unit in the non-contact state. As illustrated in FIG. 8 and FIG. 9, the information reading unit 400 has a built-in driving mechanism 430 for driving the information reading mechanism 420. For the convenience of describing the inner structure, FIG. 8 and FIG. 9 illustrate the information reading unit 400 in a state where a lid portion (cover) is removed.

The driving mechanism 430 has a rod 432, a supporting member 434, a coil spring 436, a rack 438, a pinion 440, a first rotational shaft 442, a pair of bevel gears 444, and a second rotational shaft 446. The rod 432 includes a bar-shaped member extending in the front-back direction of the information reading unit 400. In the non-operating state of the information reading mechanism 420, a tip end portion of the bar-shaped member projects from the front surface of the information reading unit 400. The supporting member 434 is a member which has includes two uprising plate members, which supports the rod 432 to be capable of reciprocating in the axial direction, and is fixed on the inner bottom surface of the information reading unit 400. The coil spring 436 is provided between the two uprising plate members in the supporting member 434 and biases the rod 432 in the direction projecting from the front surface of the information reading unit 400. The rack 438 is a movable member coupled to a base end portion of the rod 432 and has a projection 438A to operate a switch. The pinion 440 engages with the rack 438 and converts the linear motion of the rod 432 to a rotational motion. The first rotational shaft 442 couples the pinion 440 and the bevel gears 444 and transmits the rotational motion of the pinion 440 to the bevel gears 444. The bevel gears 444 change the rotational motion transmitted from the pinion 440 by substantially 90 degrees. The second rotational shaft 446 couples the bevel gears 444 and the plate member 422 of the information reading mechanism 420 and rotates the plate member 422 by the rotation of the bevel gears 444 between the fallen position and the upright position.

Figure 10:
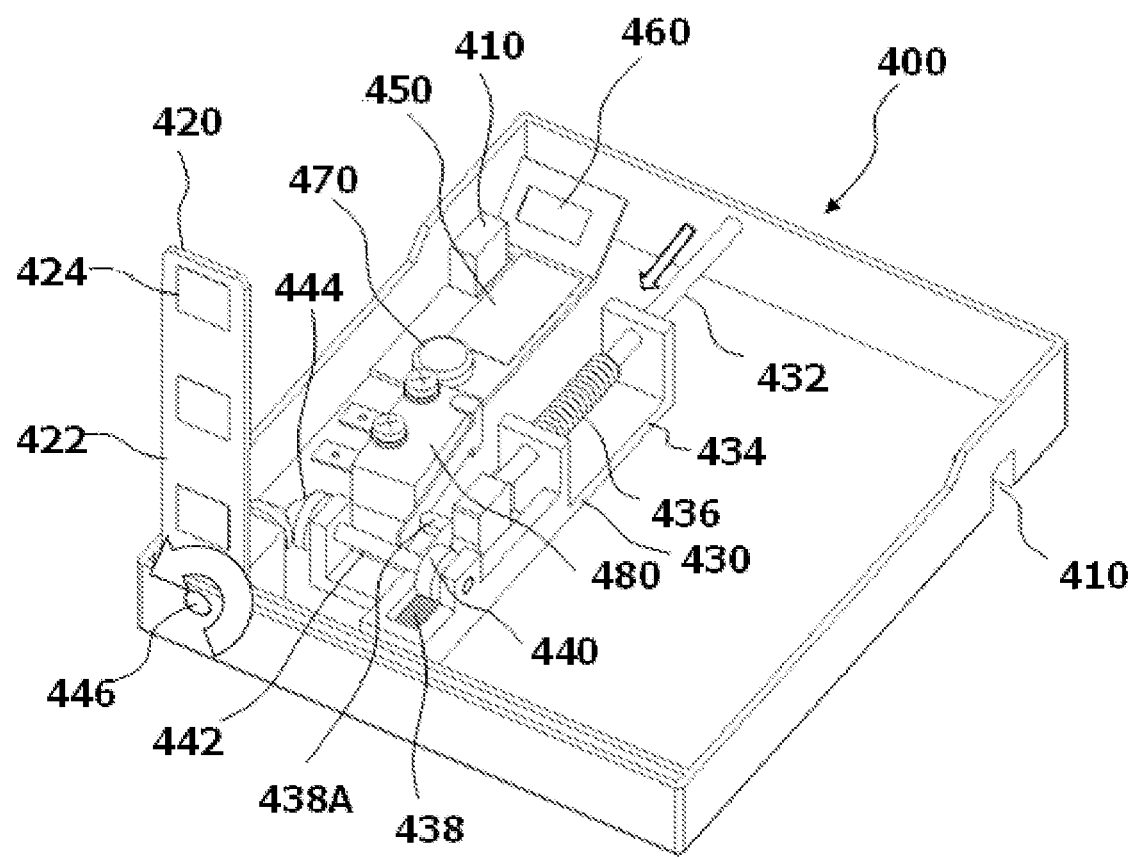
FIG. 10 illustrates an exemplary perspective view of an inside of an information reading unit in an operating state.
Figure 11:
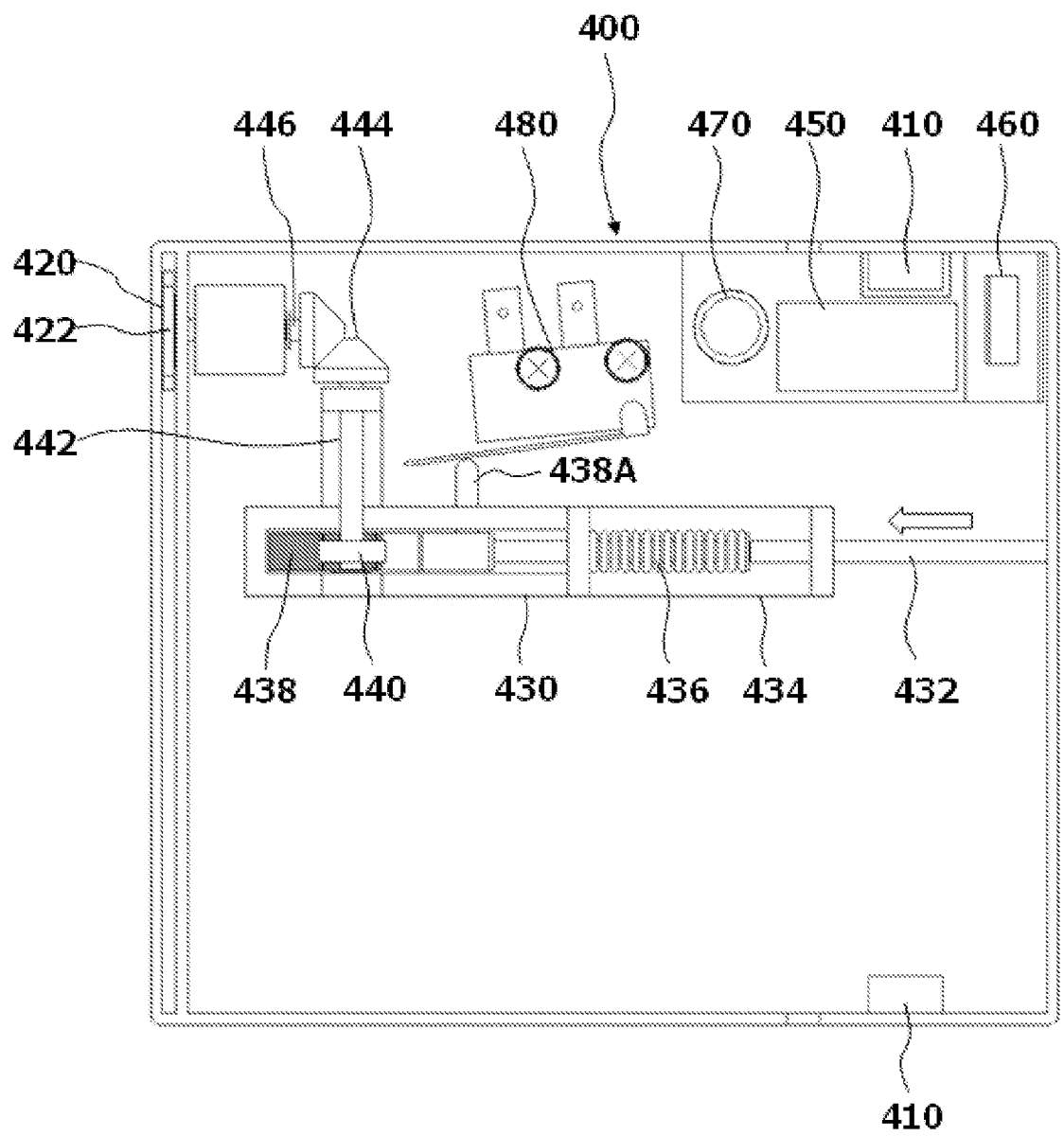
FIG. 11 illustrates an exemplary plan view of an inside of an information reading unit in an operating state.

FIG. 10 illustrates an exemplary perspective view of an inside of the information reading unit in an operating state. FIG. 11 illustrates an exemplary plan view of an inside of the information reading unit in an operating state. For example, as illustrated in FIG. 10 and FIG. 11, when external force acts on the rod 432 to push the rod 432 against the urging force of the coil spring 436, the rack 438 integrated with the rod 432 rotates the pinion 440. The direction of the rotational motion of the pinion 440 is changed by substantially 90 degrees by the bevel gears 444 to rotate the plate member 422 of the information reading mechanism 420 from the fallen position to the upright position. Accordingly, the information reading mechanism 420 projects from the information reading unit 400 and the preparation for reading the individual information from the cartridge memory 210 of the magnetic tape cartridge 200 is completed.

On the other hand, when the external force stops acting on the rod 432, the rod 432 is moved in a direction projecting from the front surface of the information reading unit 400 by the urging force of the coil spring 436. When the rod 432 moves, the rack 438 integrated with the rod 432 rotates the pinion 440. For example, the rotational direction of the pinion 440 may be a direction opposite to the direction when the rod 432 is pushed. The direction of the rotational motion of the pinion 440 is changed by substantially 90 degrees by the bevel gears 444 to rotate the plate member 422 of the information reading mechanism 420 from the upright position to the fallen position. Accordingly, the information reading mechanism 420 is accommodated in the information reading unit 400 and is to have the outer dimensions substantially same as that of the magnetic tape cartridge 200.

The information reading unit 400 internally includes a control circuit 450 which controls the memory reader 424 of the information reading mechanism 420, an information transmission unit 460 which transmits the individual information read by the memory reader 424 to the hand 300 in the non-contact manner, and a battery 470 such as a button battery. As illustrated in FIG. 10 and FIG. 11, the information reading unit 400 is provided with a switch 480 such as a limit switch which supplies power to the control circuit 450 and the information transmission unit 460 from the battery 470 when the rod 432 is pushed and the information reading mechanism 420 projects. For example, the switch 480 operates by being pushed by the projection 438A projecting from the rack 438. When the information reading unit 400 is not used, power is not supplied to the control circuit 450 and the information transmission unit 460 from the battery 470, so that power consumption of the battery 470 may be suppressed.

Figure 12:
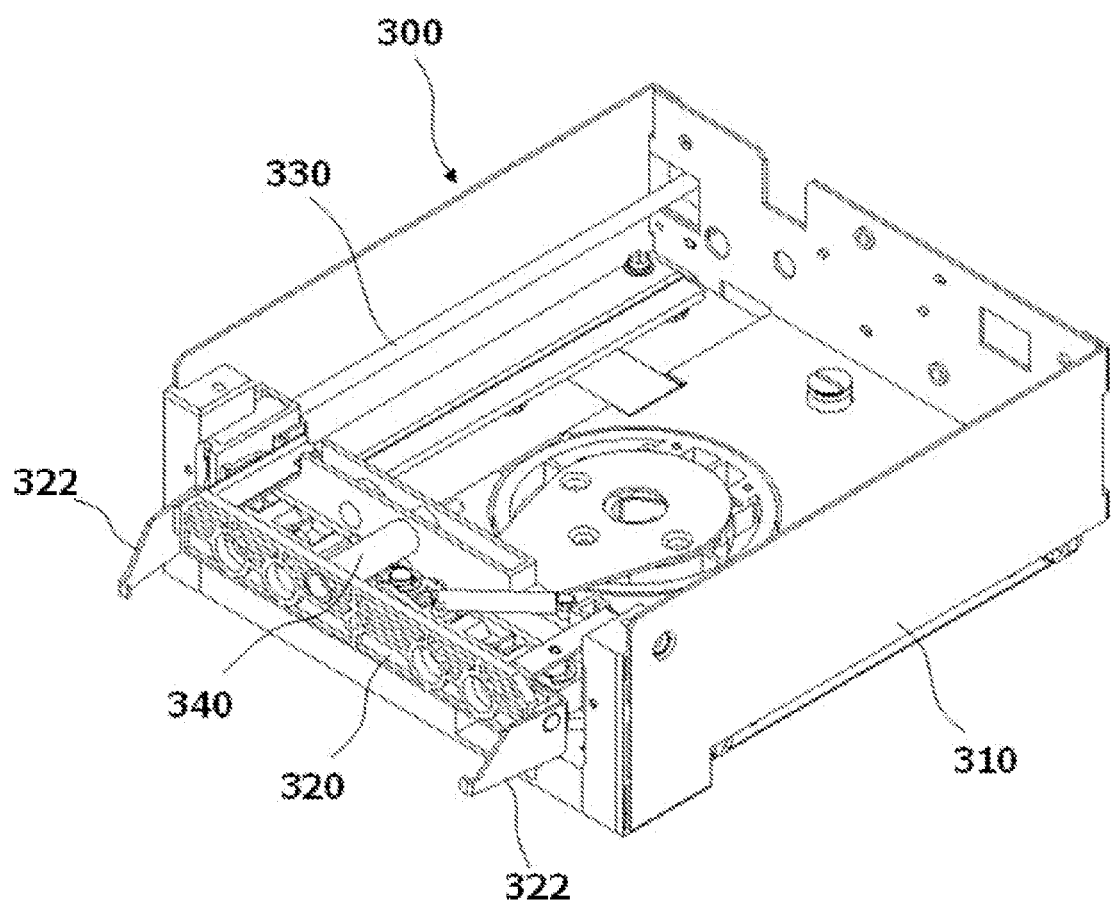
FIG. 12 illustrates an example of a hand.
Figure 13:
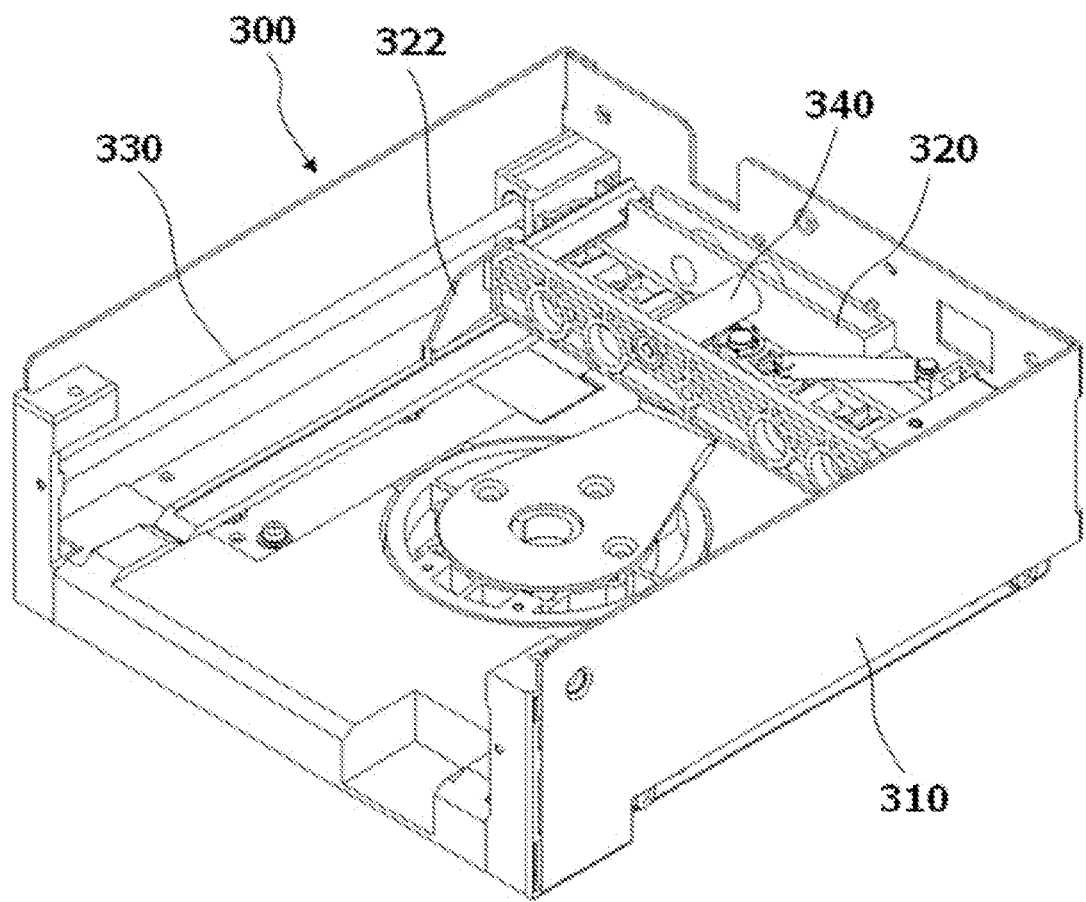
FIG. 13 illustrates an example of a hand.

FIG. 12 and FIG. 13 illustrate an exemplary hand. FIG. 12 illustrates a perspective view of an inside of the hand in a non-operating state. FIG. 13 illustrates a perspective view of an inside of the hand in an operating state. For the convenience of describing the inner structure, FIG. 12 and FIG. 13 illustrate the hand 300 in a state where an upper plate is removed. The actual hand 300 has a substantially cuboid outer shape with the upper plate.

The hand 300 has a built-in mounter 320 which is designed to insert or discharge the magnetic tape cartridge 200 or the information reading unit 400 into or from a substantially cuboid-shaped casing 310 in which one surface is opened. The mounter 320 is guided by a pair of right and left guide pipes 330 which extends in the front-back direction on the both sides of the casing 310, and reciprocates in one direction by an actuator such as an electric motor. The tip end portion (on the opening side) of the mounter 320 is provided with a pair of right and left claw portions 322 which engage with the recessed portion 220 of the magnetic tape cartridge 200 or a recessed portions 410 of the information reading unit 400. The claw portions 322 open with each other in a separating direction in the non-operating state of the mounter 320. The claw portions 322 narrow in a direction of sandwiching the magnetic tape cartridge 200 or the information reading unit 400 when the mounter 320 operates. For example, as power to open and close the claw portions 322, an output of the actuator reciprocating the mounter 320 may be utilized through various link mechanisms.

Figure 14:
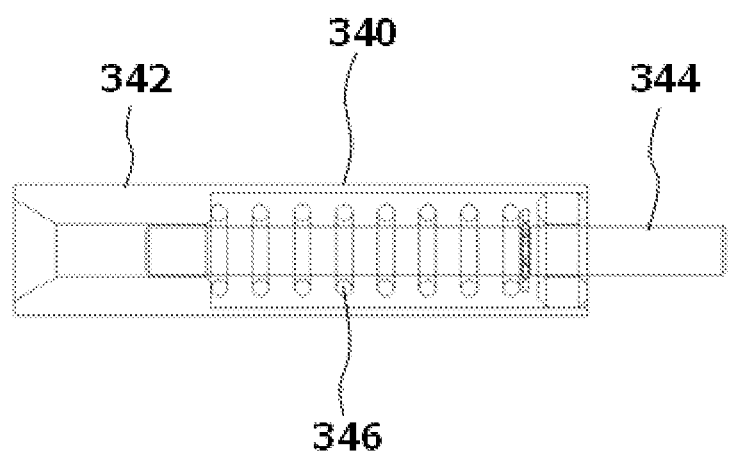
FIG. 14 illustrates an exemplary cross-sectional view of an operation mechanism in a non-operating state.
Figure 15:
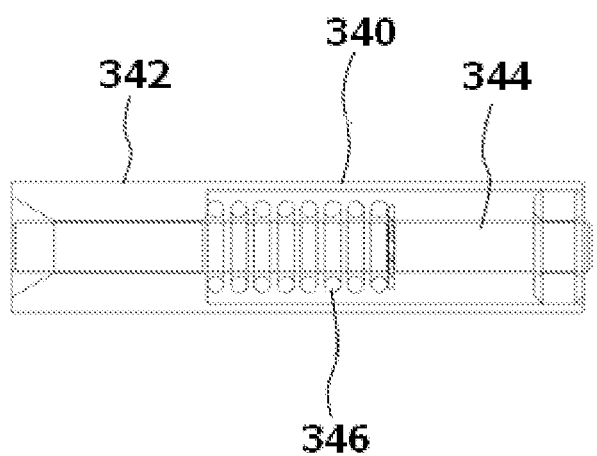
FIG. 15 illustrates an exemplary cross-sectional view of an operation mechanism in an operating state.

As illustrated in FIG. 13, in the mounter 320, an operation mechanism 340 is incorporated to push the rod 432 against the urging force of the coil spring 436 when the information reading unit 400 is pulled into the innermost portion. FIG. 14 illustrates an exemplary cross-sectional view of an operation mechanism in a non-operating state. As illustrated in FIG. 14, the operation mechanism 340 has a cylindrical member 342 which passes through the mounter 320 in the front-back direction, a rod 344 which is inserted into the cylindrical member 342 and projects from the end surface facing the innermost portion, and a coil spring 346 which urges the rod 344 in a projecting direction. The cylindrical member 342 is provided in a position which becomes concentric with the rod 432 of the information reading unit 400 in a state where the claw portions 322 of the mounter 320 engage with the recessed portions 410 of the information reading unit 400. The end surface of the rod 344 positioned on the opening side of the casing 310 is in a position recessed by a distance substantially the same as the projected length of the rod 432 of the information reading unit 400 from the end surface of the cylindrical member 342. Accordingly, in the state where the information reading unit 400 is held by the mounter 320, the information reading mechanism 420 of the information reading unit 400 does not operate. When the mounter 320 moves to the innermost portion of the hand 300, the tip end portion of the rod 344 comes in contact with the inner back surface of the casing 310 and the rod 344 starts moving to the opening side against the urging face of the coil spring 346. FIG. 15 illustrates an exemplary cross-sectional view of an operation mechanism in an operating state. When the mounter 320 moves to the innermost portion of the hand 300, as illustrated in FIG. 15, the rod 344 moves to the direction of the base end portion (an end portion on the opposite side to the tip end portion) of the rod 344. The projected length of the rod 344 may have a length with which the information reading mechanism 420 of the information reading unit 400 is operable.

In the magnetic tape library apparatus 100, for example, an operator opens or closes a door of the casing 110 and the magnetic tape cartridge 200 is replaced with a new one. When the operator exchanges the magnetic tape cartridge 200, there is a possibility that a controller of the magnetic tape library apparatus 100 may not find a magnetic tape cartridge 200 which is exchanged. Accordingly, the controller of the magnetic tape library apparatus 100 may read the individual information of all the magnetic tape cartridges 200 which are accommodated in the cell 130.

Figure 16:
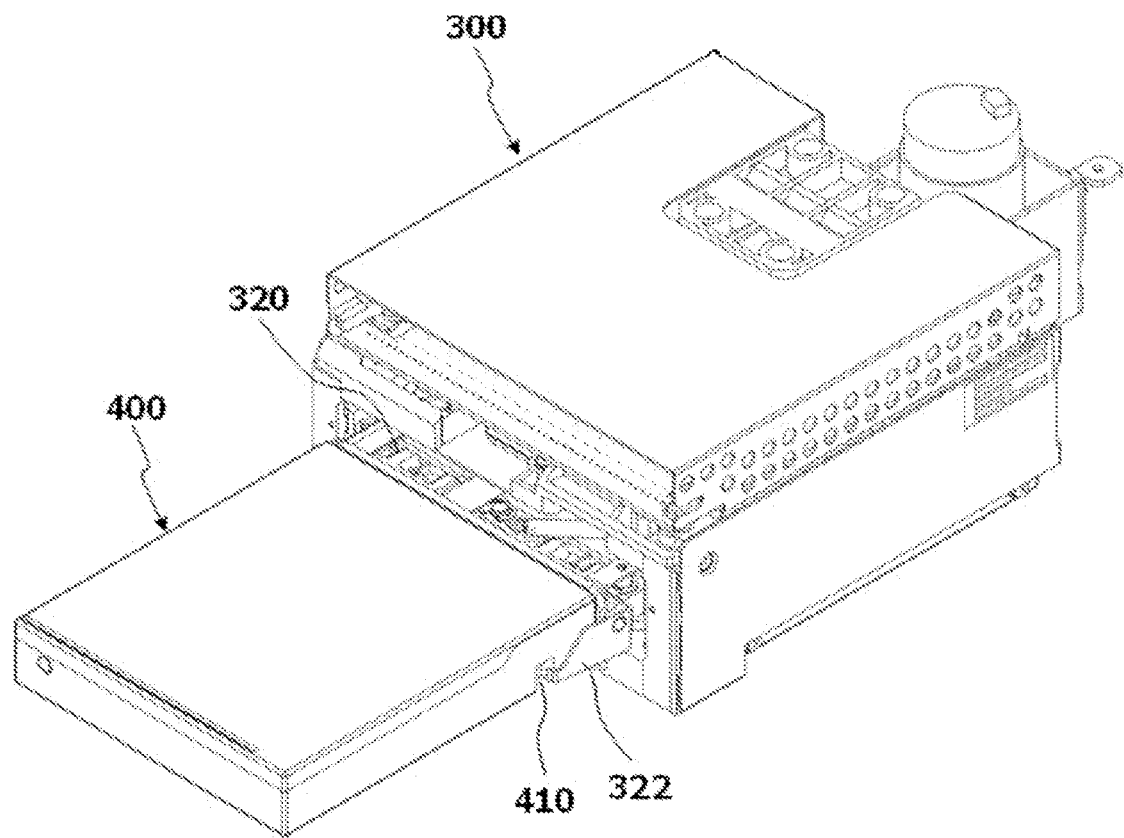
FIG. 16 illustrates an exemplary perspective view of an initial state in which a information reading unit is pulled into a hand.
Figure 17:
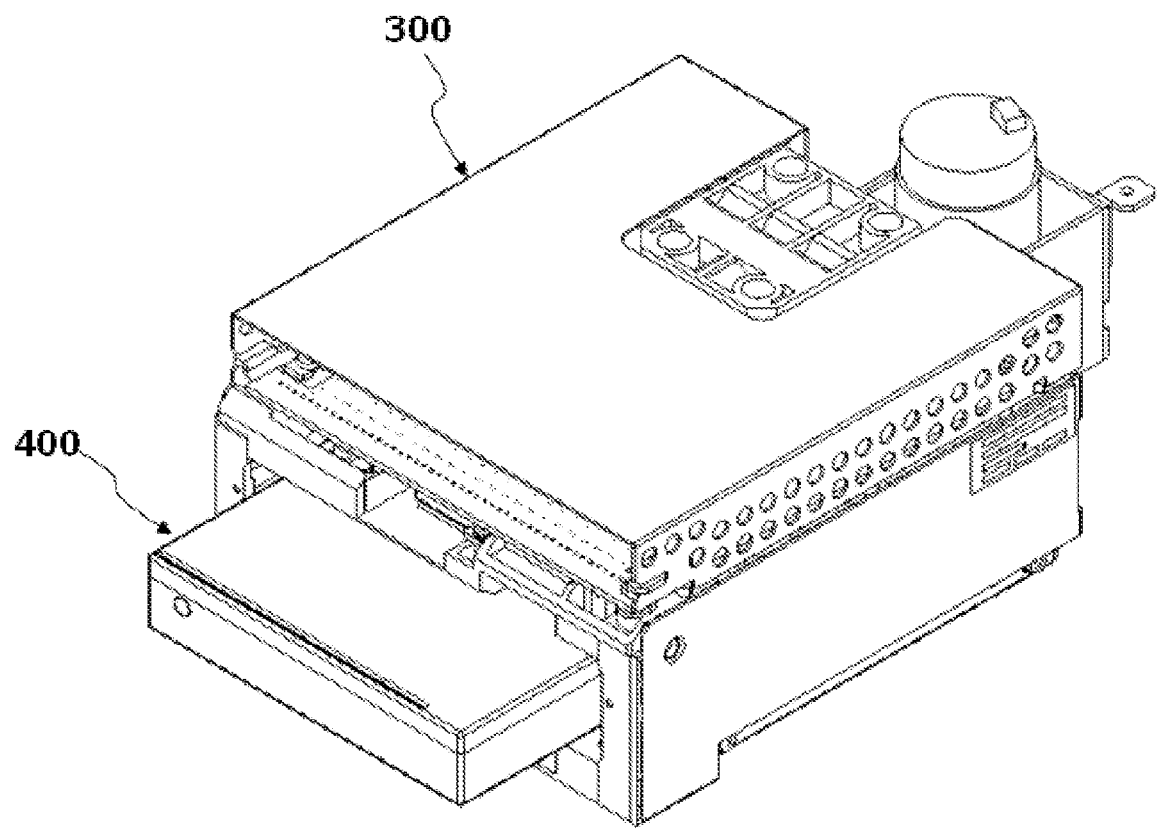
FIG. 17 illustrates an exemplary perspective view of in-process state in which an information reading unit is being pulled into a hand.

FIG. 16 illustrates an exemplary perspective view of an initial state in which an information reading unit is pulled into the hand. FIG. 17 illustrates an exemplary perspective view of an intermediate state in which an information reading unit is being pulled into the hand. The controller of the magnetic tape library apparatus 100 outputs driving signals for the robot 150, and, as illustrated in FIG. 16, causes the hand 300 to face the information reading unit 400. When the movement of the mounter 320 of the hand 300 is started in this state, the pair of the right and left claw portions 322 are narrowed and engaged with the recessed portions 410 of the information reading unit 400 to hold. When the mounter 320 begins to move toward the innermost portion of the hand 300, as illustrated in FIG. 17, the information reading unit 400 is pulled into the innermost portion of the hand 300.

Figure 18A:
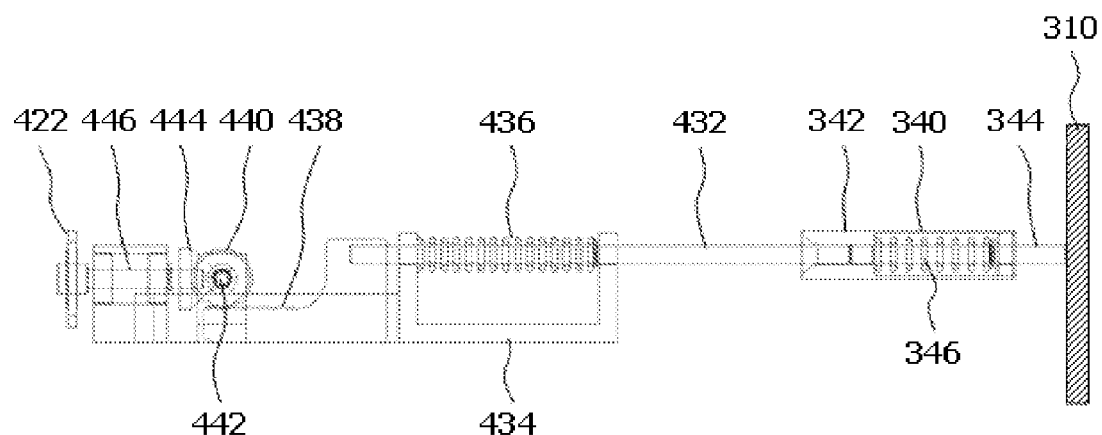
FIG. 18A and FIG. 18B illustrate an example of an information reading mechanism.
Figure 18B:
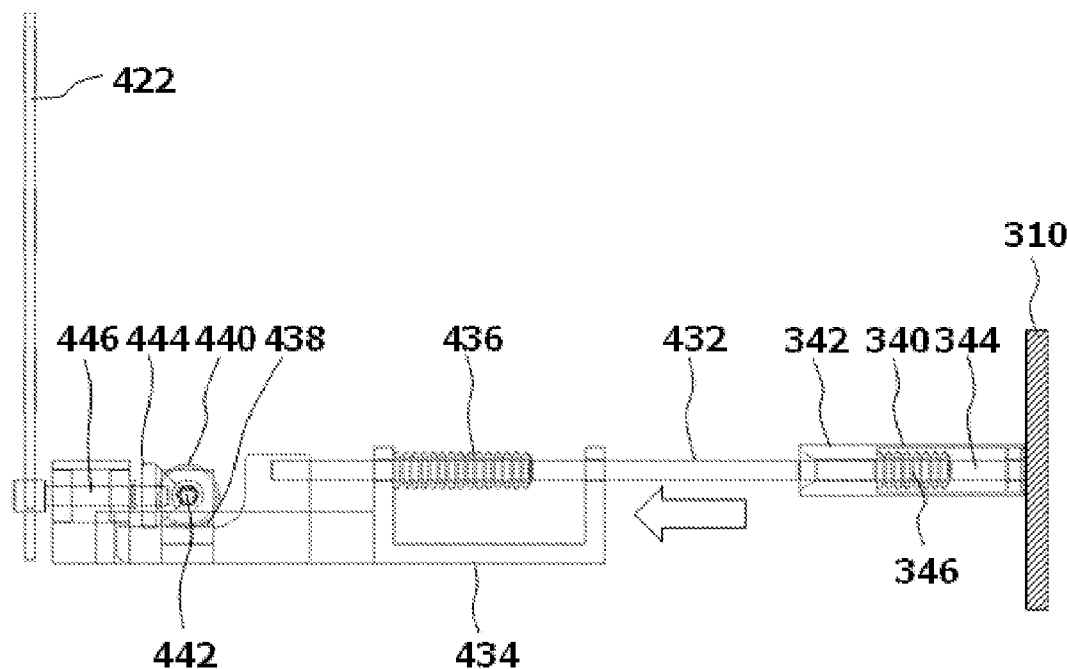
Figure 19:
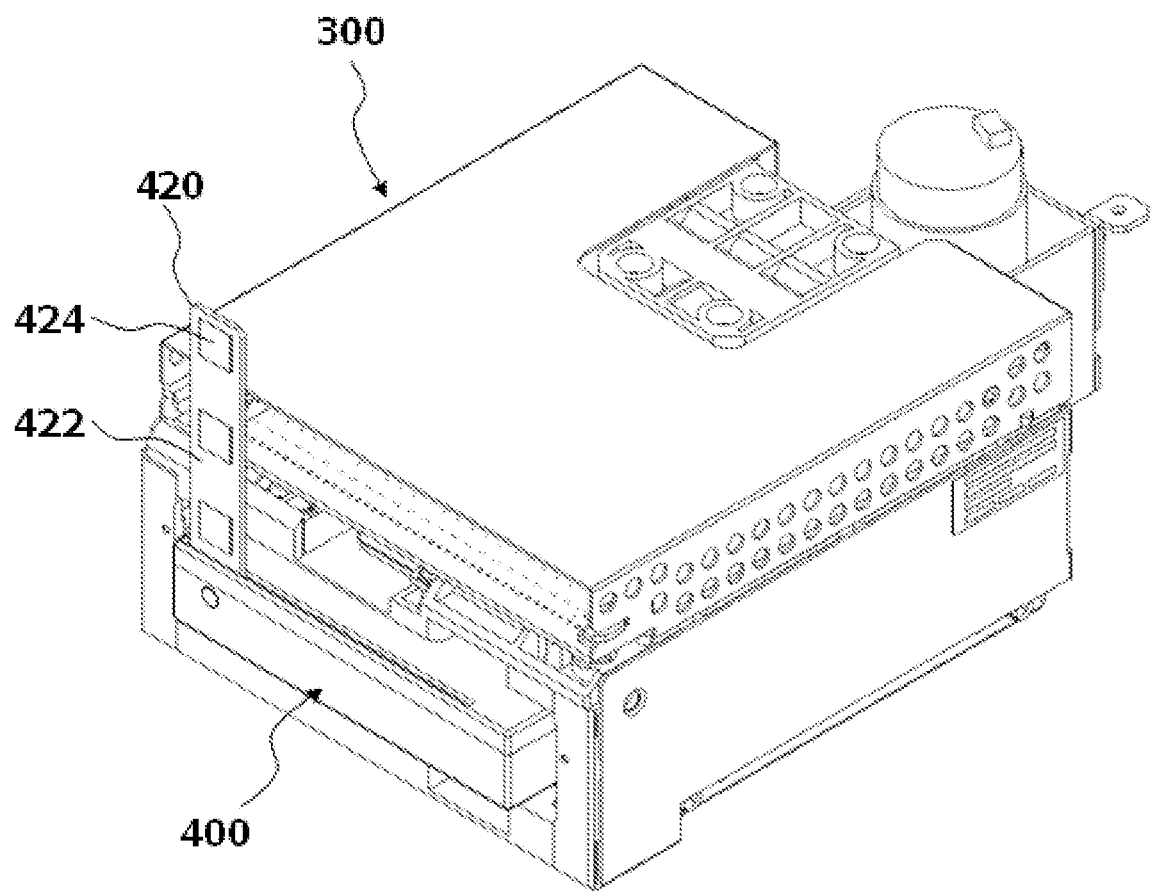
FIG. 19 illustrates an exemplary perspective view of a final state in which a information reading unit has been pulled into a hand.

FIG. 18A and FIG. 18B illustrate an example of an information reading mechanism. FIG. 18A illustrates a non-operating state and FIG. 18B illustrates an operating state. FIG. 19 illustrates an exemplary perspective view of a final state in which an information reading unit has been pulled into a hand. When the information reading unit 400 is pulled into the hand 300 near the innermost portion thereof, as illustrated in FIG. 18A, the tip end portion of the rod 344 of the operation mechanism 340 provided in the mounter 320 contacts with the casing 310. Along with the pulling of the information reading unit 400, as illustrated in FIG. 18B, the rod 344 moves to the direction of the information reading unit 400 against the urging force of the coil spring 346. When the rod 344 moves in the direction of the information reading unit 400, the rod 432 projecting from the information reading unit 400 is pushed in against the urging force of the coil spring 436. Accordingly, as illustrated in FIG. 19, the plate member 422 of the information reading mechanism 420 rotates from the fallen position to the upright position to project.

Figure 20:
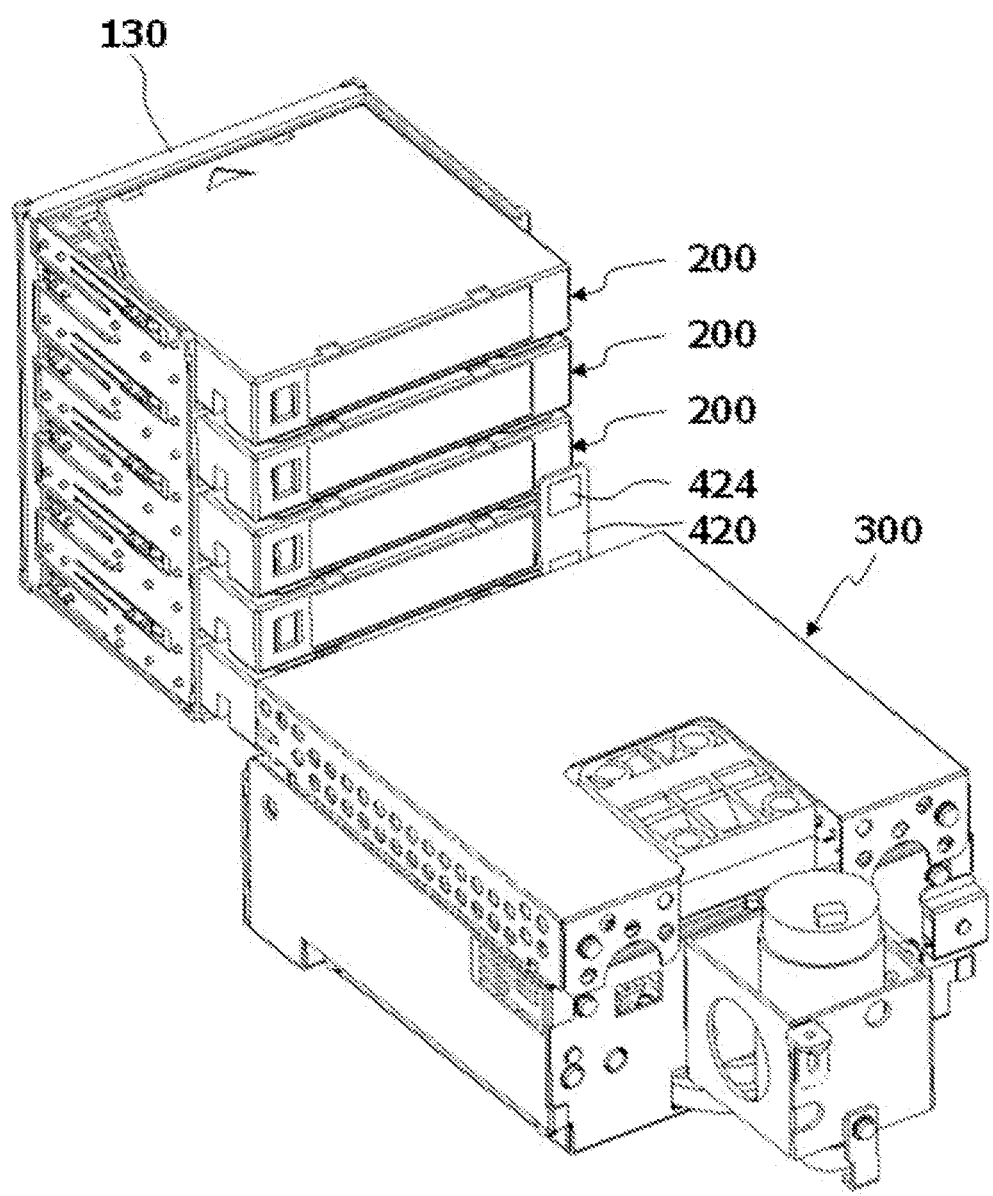
FIG. 20 illustrates an exemplary method of reading individual information from multiple magnetic tape cartridges at the same time.
Figure 21:
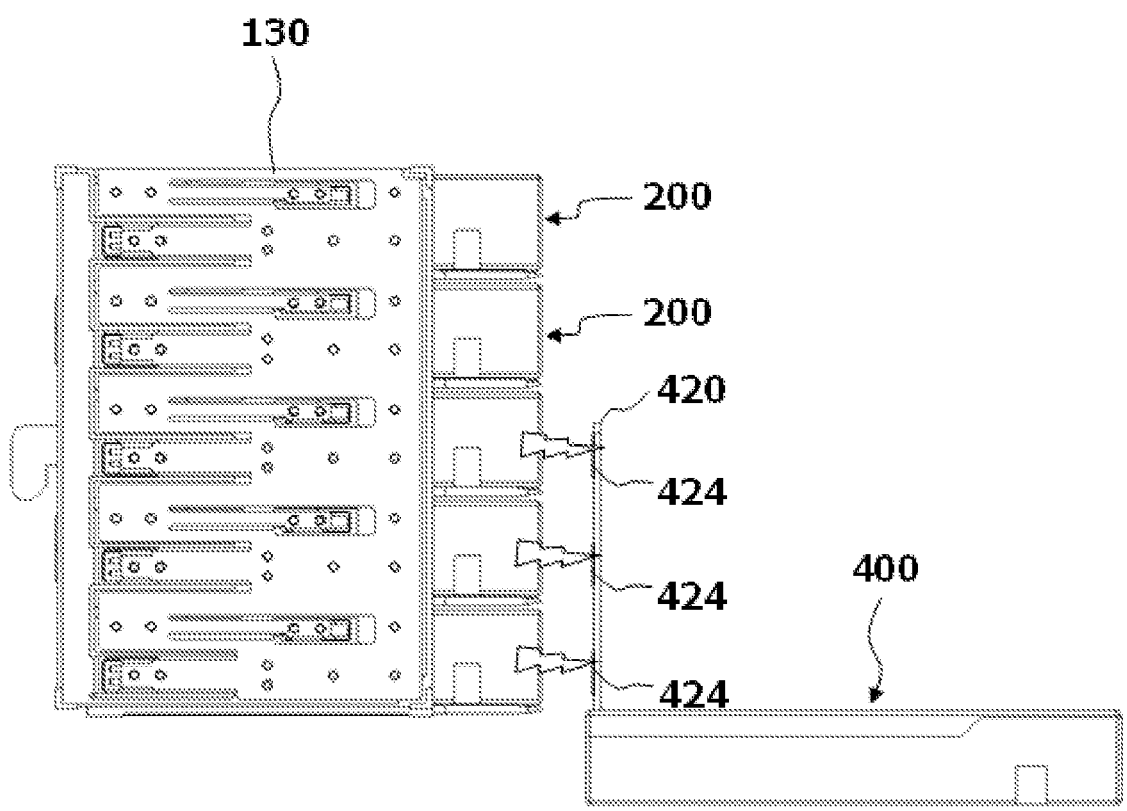
FIG. 21 illustrates an exemplary method of reading individual information from the multiple magnetic tape cartridges at the same time.

FIG. 20 and FIG. 21 illustrate an example of reading individual information. FIG. 20 and FIG. 21 illustrate an exemplary method of reading individual information from multiple magnetic tape cartridges. The individual information may be read at the substantially same time. When the plate member 422 of the information reading mechanism 420 projects, the controller of the magnetic tape library apparatus 100 causes the memory reader 424 of the information reading unit 400 to face the cartridge memory 210 of the magnetic tape cartridge 200, as illustrated in FIG. 20. As illustrated in FIG. 21, the memory reader 424 may read the individual information at the substantially same time from adjacent three rolls of the magnetic tape cartridges 200 in the upper and lower direction. The individual information read from the magnetic tape cartridges 200 is transmitted to the hand 300 through the information transmission unit 460 and transmitted to the controller through an information transmission path.

When the individual information of the next magnetic tape cartridge 200 is read, the controller of the magnetic tape library apparatus 100 causes the memory reader 424 of the information reading unit 400 to face a cartridge memory 210 of another magnetic tape cartridge 200. As described above, the individual information is read at the substantially same time from the adjacent three rolls of the magnetic tape cartridges 200 in the upper and lower direction. These procedures are sequentially repeated to read the individual information of all the magnetic tape cartridges 200 accommodated in the magnetic tape library apparatus 100.

At this time, the individual information of the three rolls of the magnetic tape cartridges 200 is read at the substantially same time by the information reading unit 400 without moving the hand 300, and accordingly, a time taken for reading the individual information may be shortened. Since the time taken for reading the individual information is shortened, for example, after the magnetic tape cartridge 200 is replaced with a new one, a period of time during which a user is unable to use the magnetic tape library apparatus 100 may be shortened.

The recording medium is not limited to the magnetic tape cartridge 200, but may be a cartridge-type hard disk drive, for example. The individual information of the recording medium is not limited to the cartridge memory 210 but may be a flash read only memory (ROM) in which data is capable of being electrically read and written, for example. The driving mechanism 430 in the information reading unit 400 may include a switch which operates when the information reading unit 400 is pulled into the innermost portion of the hand 300 and an electric motor which rotates the plate member 422 of the information reading mechanism 420.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A library apparatus, comprising:
a plurality of cells in each of which a cartridge-type recording medium is attachably and detachably accommodated;
a robot including a hand configured to handle the recording medium;
an information reading unit which is attachably and detachably accommodated in the cells and includes a plurality of readers configured to read information of the recording medium; and
a projection mechanism which projects the plurality of readers to be capable of reading the information of the recording medium when the information reading unit is pulled into a portion of the hand,
wherein the information reading unit includes a control circuit configured to control the plurality of readers, and an information transmission unit configured to transmit, to the hand, the information read by the plurality of readers.

2. The library apparatus according to claim 1, wherein the portion of the hand is an innermost portion of the hand.

3. The library apparatus according to claim 1, wherein the plurality of readers are provided in a plate member rotatable between a fallen position and an upright position with respect to the information reading unit.

4. The library apparatus according to claim 3, wherein when the information reading unit is pulled into the innermost portion of the hand, the plate member rotates from the fallen position to the upright position by pushing a rod in contact with an inner wall of a casing of the information reading unit.

5. The library apparatus according to claim 1, wherein a plurality of information reading units are accommodated in the cells.

6. The library apparatus according to claim 1, wherein the projection mechanism projects, from the information reading unit, one portion of a plate member on which the plurality of readers are provided and leaves, in the information reading unit, the other portion of the plate member on which the plurality of readers are not provided.

7. The library apparatus according to claim 6, comprising
a battery configured to supply power to the control circuit and the information transmission unit; and
a switch configured to start supplying power to the control circuit and the information transmission unit from the battery when the information reading unit is pulled into the portion of the hand.

8. The library apparatus according to claim 1, wherein the information of the recording medium is stored in a cartridge memory including a non-volatile memory.

9. The library apparatus according to claim 1, wherein the recording medium is a magnetic tape cartridge.

10. A method of reading information of a recording medium, comprising:
   accommodating, in a cell, an information reading unit in which a plurality of readers to read information of a cartridge-type recording medium, is provided, the plurality of readers being capable of projecting;
   projecting, by a projection mechanism, the plurality of readers when the information recording unit is pulled into a portion of a hand; and
   transmitting, to the hand, the information read by the plurality of readers,
   wherein individual information of a plurality of recording media is read substantially at the same time by the projecting.

11. The method according to claim 10, wherein the portion of the hand is an innermost portion of the hand.

12. The method according to claim 10, wherein the information reading unit is pulled into the innermost portion by a hand of a robot configured to handle the recording medium.

13. A library apparatus, comprising:
   a plurality of cells in each of which a cartridge-type recording medium is attachably and detachably accommodated;
   a robot including a hand configured to handle the recording medium; and
   an information reading unit which is attachably and detachably accommodated in the cells and includes a plurality of readers configured to read information of the recording medium,
   wherein, when the information reading unit is pulled into a portion of the hand, the plurality of readers project to be capable of reading the information of the recording medium, the plurality of readers being provided in a plate member rotatable between a fallen position and an upright position with respect to the information reading unit.

14. The library apparatus according to claim 13, wherein the portion of the hand is an innermost portion of the hand.

15. The library apparatus according to claim 13, wherein a plurality of information reading units are accommodated in the cells.

16. The library apparatus according to claim 13, wherein the information reading unit includes a control circuit configured to control the plurality of readers, and an information transmission unit configured to transmit, to the hand, the information read by the plurality of readers.

17. The library apparatus according to claim 13, wherein the information of the recording medium is stored in a cartridge memory including a non-volatile memory.

18. The library apparatus according to claim 13, wherein the recording medium is a magnetic tape cartridge.

* * * * *